United States Patent [19]
Brown

[11] Patent Number: 5,958,329
[45] Date of Patent: Sep. 28, 1999

[54] METHOD AND APPARATUS FOR PRODUCING NANOPARTICLES AT A HIGH RATE

[75] Inventor: Donald Lee Brown, Livermore, Calif.

[73] Assignee: United States Enrichment Corporation, Bethesda, Md.

[21] Appl. No.: 08/965,469

[22] Filed: Nov. 6, 1997

[51] Int. Cl.⁶ ....................................................... B22F 9/14
[52] U.S. Cl. .................... 266/176; 266/202; 219/121.35; 425/6
[58] Field of Search .................................... 266/176, 202; 425/6; 219/121.12, 121.35

[56] References Cited

U.S. PATENT DOCUMENTS

| | | | |
|---|---|---|---|
| 4,881,722 | 11/1989 | Koizumi et al. | 266/176 |
| 5,665,277 | 9/1997 | Johnson et al. | 425/6 |
| 5,736,073 | 4/1998 | Wadley et al. | 425/6 |

Primary Examiner—George Wyszomierski
Attorney, Agent, or Firm—David G. Beck; Townsend and Townsend and Crew, LLP

[57] ABSTRACT

A method and apparatus for producing nanoparticles at a high rate is provided. The system uses two chambers separated by a narrow duct. Contained within the lower chamber is the source material, preferably heated with an electron gun and fed with a continuous feeder for extended nanoparticle production runs. The upper chamber is used to nucleate the nanoparticles, the nanoparticles formed when the source vapor collides with a gas contained within the upper chamber. Depending upon the desired nanoparticles, the gas within the upper chamber is either inert or reactive. The duct connecting the upper and lower chambers is narrow enough to allow differential pumping of the chambers. Furthermore the vapor stream flowing though the duct at high speed provides a pumping action which helps to maintain the differential pressures within the two chambers. At least a portion of the top surface of the upper chamber is cooled, thus providing a condensation site for the nanoparticles. Periodically one or more scrappers remove the condensed nanoparticles from the condensation surface, allowing them to collect within particle collection containers surrounding the duct.

18 Claims, 3 Drawing Sheets

METHOD AND APPARATUS FOR PRODUCING NANOPARTICLES AT A HIGH RATE

FIELD OF THE INVENTION

The present invention relates generally to the production of nanoparticles and, more particularly, to a method and apparatus for producing nanoparticles at a very high production rate.

BACKGROUND OF THE INVENTION

Nanoparticles are comprised of clusters of atoms with a diameter in the range of 1 to 50 nanometers. Nanoparticles have been made from metals (e.g., Pd, Cu, Fe, Ag, Ni), intermetallics (e.g., $Al_{52}Ti_{48}$), and metal oxides (e.g., $TiO_2$, $Y_2O_3$, ZnO, MgO, $Al_2O_3$).

Interest in nanoparticles has grown over the last two decades due to the unusual properties these particles possess, properties which generally arise from the large surface area to volume ratios of the particles. Once formed, the nanoparticles can be used in a powder form, used as a coating material, or condensed into nanophase materials. If denser nanophase materials are desired than achievable through cold pressing, the nanophase particles can be condensed using a hot pressing technique or sintered after the initial cold pressing step.

Nanophase materials exhibit a variety of properties. For example, nanophase metals have been reported with a yield stress and microhardness of three to five times greater than the same metals processed using conventional techniques. Nanophase ceramics exhibit vastly improved ductility and malleability. One producer of nanophase ceramics has demonstrated plastic if not superplastic deformability of a $TiO_2$ nanophase sample by pressing a cylinder of the material into a disk. The compressed disk did not exhibit any cracks or flaws. Another advantage offered by the extremely fine grain structure of nanophase materials is their ability to achieve very uniform doping at relatively low temperatures.

Particle formation techniques include chemical and physical vapor deposition, mechanical attrition, gas phase pyrolysis and condensation, electrodeposition, cryochemical synthesis, laser pyrolysis, and gel synthesis. These techniques typically produce quantities on the order of grams per hour, quantities that are sufficient for research but generally insufficient for most commercial applications.

A technique for producing large quantities of nanoparticles, on the order of kilograms per hour, is therefore desired.

SUMMARY OF THE INVENTION

The present invention provides a method and apparatus for producing nanoparticles at a high rate, typically on the order of kilograms per hour. The system uses two chambers separated by a narrow duct. Contained within the lower chamber is the source material, preferably heated with an electron beam gun and fed with a continuous feeder thus making extended nanoparticle production runs possible. The upper chamber is used to nucleate the nanoparticles, the nanoparticles are formed when the vapor collides with a gas contained within the upper chamber. Depending upon the desired nanoparticles, the gas within the upper chamber is either inert or reactive.

In order to achieve high vaporization rates while maintaining adequate control over the nanoparticle nucleation process, it is necessary to maintain a vacuum within the lower chamber on the order of $10^{-4}$ to $10^{-5}$ torr while allowing the upper chamber to have a gas pressure on the order of $10^{-1}$ to $10^{-3}$ torr. The duct connecting the upper and lower chambers is narrow enough to allow differential pumping of the chambers. Furthermore the vapor stream flowing though the duct at high speed provides a pumping action which helps to maintain the differential pressures within the two chambers.

At least a portion of the top surface of the upper chamber is cooled, thus providing a condensation site for the nanoparticles. Periodically one or more scrapers remove the condensed nanoparticles from the condensation surface, allowing them to collect within particle collection containers surrounding the duct.

In one embodiment of the invention, the walls of the enclosure within the lower chamber are heated. As a result of the heating process, vapor condensed on the chamber walls is in a liquid state and flows back into the source crucible allowing it to be re-evaporated.

In another embodiment of the invention the upper and lower chambers are contained within a single vacuum housing. Depending upon the desired vacuum pressure for the lower source chamber, it may be necessary to provide an additional vacuum housing surrounding the electron gun assembly.

A further understanding of the nature and advantages of the present invention may be realized by reference to the remaining portions of the specification and the drawings.

DETAILED DESCRIPTION OF THE INVENTION

Figure 1:
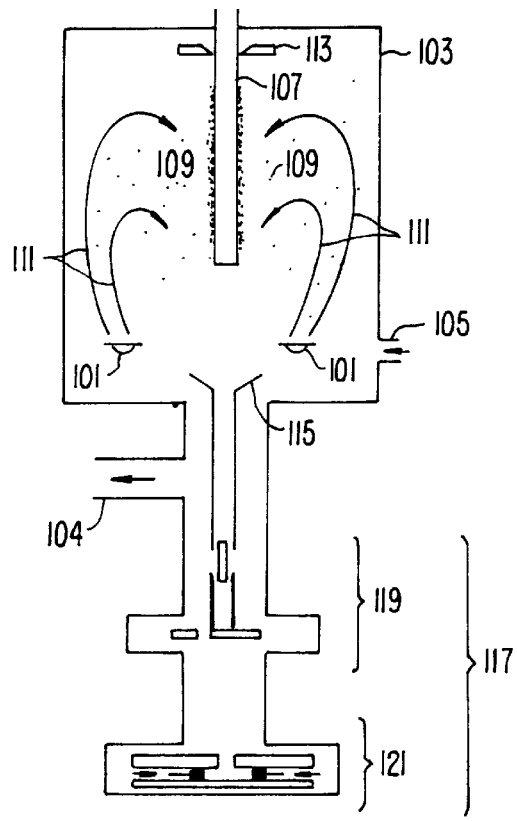
FIG. 1 is an illustration of a nanoparticle generator according to the prior art.

FIG. 1 is an illustration of a gas condensation technique of fabricating nanoparticles. Jeff Eastman and Richard Siegel disclosed this technique in the January 1989 issue of Research and Development.

In the disclosed system the material of interest is evaporated from one or more sources 101. Evaporation sources 101 are contained within a vacuum chamber 103 that is pumped down to a vacuum of approximately $10^{-7}$ torr through vacuum port 104 and then backfilled with a low pressure of gas through gas inlet 105. The backfill gas can either be an inert gas or a reactive gas. Within chamber 103 is a cold finger 107, typically cooled with liquid nitrogen.

During operation, as the atoms from sources 101 evaporate they collide with each other as well as the backfill gas forming small, discrete particles 109. Due to the difference in temperature between evaporation sources 101 and cold finger 107, a natural convective flow stream 111 is created which carries particles 109 to finger 107 where they collect. Gas pressure, evaporation rate, and gas composition primarily drive particle size.

Particles 109 are removed from finger 107 with a scraper 113. In the prior art system shown in FIG. 1, scraper 113 is an annular ring formed of Teflon which, during use, slides along finger 107. As a result of scraper 113 sliding along finger 107, particles 109 are scraped from the tube and transferred via a funnel 115 to a two step compaction system 117. In order to improve the performance of the compacted nanophase materials, compaction system 117 is evacuated, thereby removing the inert or reactive gases used during particle formation.

Compaction system 117 consists of a low pressure compaction unit 119 and a high pressure compaction unit 121. Unit 119 uses a piston and anvil to form a loosely compacted pellet that is then transferred to high pressure unit 121 for further processing.

Figure 2:
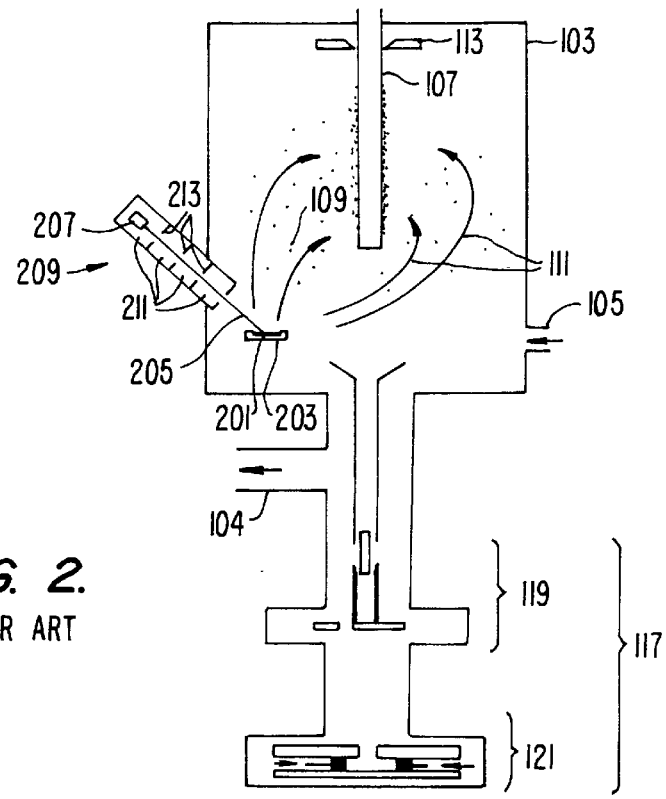
FIG. 2 is an illustration of a second nanoparticle generator according to the prior art.

FIG. 2 is an illustration of a second nanoparticle generator according to the prior art. This chamber is identical to that illustrated in FIG. 1 with the exception of the means of generating the vapor. In this chamber a source material 201 is held within a crucible 203. An electron beam (i.e., e-beam) 205 heats material 201, causing the formation of a source vapor. E-beam 205 is generated by an electron beam gun 207 contained within a separate evacuated chamber 209. Chamber 209 is required in order to maintain gun 207 at a low enough pressure to operate efficiently and to minimize electrode erosion through ion bombardment. Typically chamber 209 is evacuated to a pressure of $10^{-4}$ torr or less while nanoparticle production chamber 103 is maintained at a pressure between $10^{-1}$ and $10^{-3}$ torr in order to achieve adequate nanoparticle production. To obtain a sufficient pressure differential between gun 207 and chamber 103, gun chamber 209 is comprised of a series of separately evacuated pumping stages 211. E-beam 205 passes through a series of apertures 213. This system allows gun 209 to be evacuated to a pressure at least an order of magnitude less than the pressure maintained within chamber 103.

Figure 3:
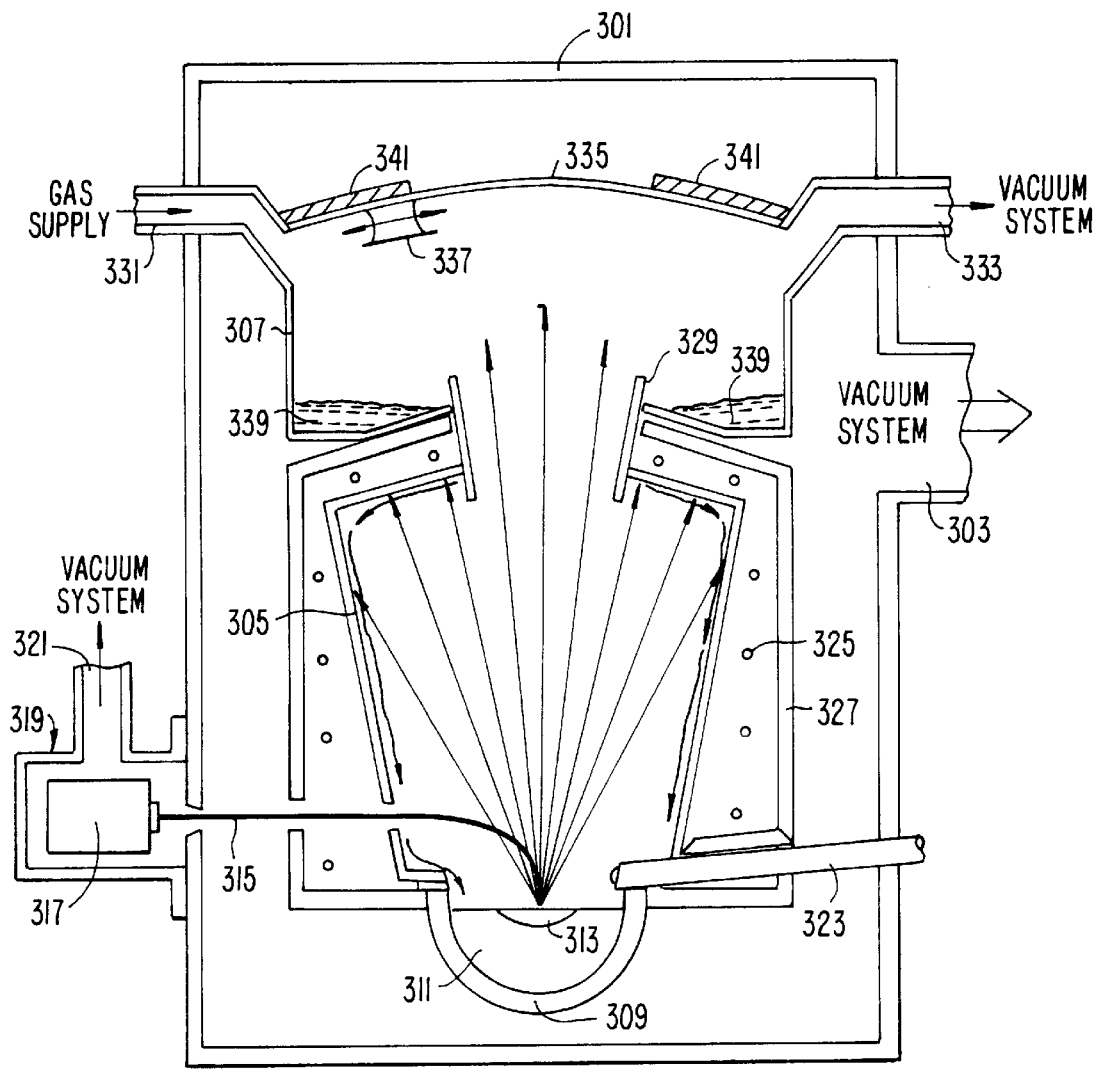
FIG. 3 is an illustration of a nanoparticle generator according to the present invention.

FIG. 3 is an illustration of a nanoparticle generator according to the present invention that allows the production of nanoparticles on the order of kilograms per hour. The entire nanoparticle generator is contained within a vacuum chamber 301. Chamber 301 is evacuated through a vacuum port 303. Within chamber 301 is a vapor source chamber 305 and a particle formation chamber 307. This two chamber design allows chamber 307 to be maintained at a high enough pressure (e.g., $10^{-1}$ to $10^{-3}$ torr) to promote particle nucleation while allowing chamber 305 to be maintained at a low enough pressure (e.g., $10^{-4}$ to $10^{-5}$ torr) to permit an e-beam vapor source producing more than a kilogram per hour of material. This design eliminates the need for a series of pumping stages as used in the prior art approach (e.g., stages 211 of FIG. 2) while still maintaining a low enough pressure to efficiently operate an electron gun and a high enough pressure to produce nanoparticles. This design also allows the source to be maintained at a low pressure, thus assisting the vaporization process to operate at a high rate.

The vapor source material is contained within a crucible 309 coupled to chamber 305. Preferably crucible 309 is cooled, thus insuring that a protective layer 311 (i.e., skull) is formed between crucible 309 and a melt region 313 of the source. The source material is heated by an e-beam 315 generated by an e-beam source 317. E-beam 315 is directed to melt region 313 using well known beam manipulation techniques such as electromagnets (not shown). In one embodiment e-beam source 317 is contained within a separate enclosure 319 so that it may be differeritially pumped via vacuum port 321.

In order to sustain a longer nanoparticle production time, source material may be continuously fed into crucible 309 via a feed system 323. Feed system 323 may feed pellets, bar stock, or other forms of source material into the system. Furthermore, multiple crucibles 309 may be used, thus allowing multi-component nanoparticles to be formed through the co-evaporation of the different materials contained in the separate crucibles.

In the preferred embodiment, chamber 305 is surrounded by a series of heaters 325 and an outer chamber wall 327. Heaters 325 maintain the walls of chamber 305 at a high enough temperature to allow source vapor condensing on walls 305 to flow back into crucible 309.

Chamber 305 is coupled to chamber 307 through a narrow duct 329, thus allowing chambers 305 and 307 to be maintained at different pressures. As described above, e-beam source 317 is most efficient at high vacuums. A high vacuum at the source also helps to achieve high vaporization rates. In contrast, the production of nanoparticles requires the relatively low vacuums resulting from the introduction of gas into the chamber. The gas is required to slow down the vapor velocity and to promote the nucleation of particles. Duct 329 allows the two chambers to undergo differential pumping, thus obtaining different vacuum pressures within each chamber. Furthermore the vapor stream flowing through the duct at a high speed provides a pumping action, very similar to a diffusion pump. This pumping action helps to keep the nucleation gas in upper chamber 307 and maintain the differential pressures within the two chambers.

Chamber 307 contains a gas at a pressure adequate to reduce the mean free path of the vapor molecules to a fraction of a centimeter. The gas may be either inert or reactive with the source material. As in the prior art, the vapor collides with the gas, creating nanoparticles. In the preferred embodiment, the gas enters chamber 307 through gas inlet 331. In this embodiment chamber 307 is also coupled to a vacuum system through port 333.

Chamber 307 is cooled, thus aiding particle formation as well as providing a collection site. Typically only upper surface 335 of chamber 307 is cooled, preferably to liquid nitrogen temperatures. A scraper 337 is used to scrap the collected nanoparticles from surface 335. The particles that are scraped from surface 335 fall into collection areas 339 surrounding duct 329. The scraper is designed to minimize material falling back through duct 329 into crucible 309. In one embodiment only areas 341 of surface 335 are cooled thus creating a temperature differential across surface 335. The temperature differential causes most of the produced nanoparticles to collect on the regions of surface 335 adjacent to cooled areas 341, thereby maximizing the collection of nanoparticles and minimizing nanoparticles recirculated through duct 329 into crucible 309.

Figure 4:
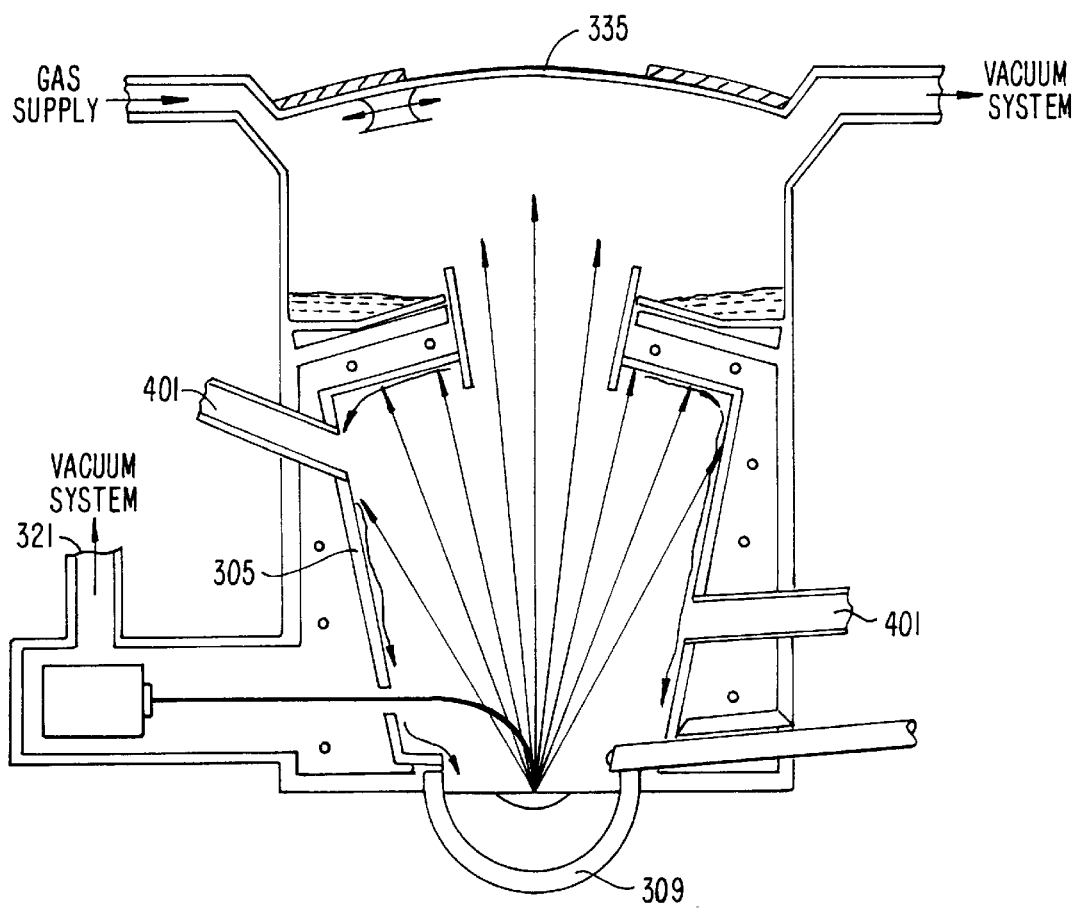
FIG. 4 is an illustration of an alternate embodiment of the nanoparticle generator shown in FIG. 3.

FIG. 4 is an illustration of an alternate embodiment of the invention. This nanoparticle generation system is basically the same as that illustrated in FIG. 3 except that it does not utilize an overall system chamber 301. Therefore source chamber 305 is primarily evacuated through port 321. Additional vacuum ports 401 may be required in order to maintain a low enough pressure within chamber 305. This system has one less chamber than the system illustrated in FIG. 3 and therefore is mechanically less complex.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention that is set forth in the following claims.

What is claimed is:

1. A nanoparticle production system capable of producing nanoparticles at a rate of kilograms per hour, said system comprising:

a first chamber;

a crucible within said first chamber for holding a source material;

a first vacuum system coupled to said first chamber for evacuating said first chamber to a first pressure;

an electron beam gun coupled to said first chamber for producing an electron beam, wherein said electron beam gun is maintained at approximately said first pressure;

a second chamber coupled to said first chamber by a duct, wherein a portion of a source vapor produced by irradiating said source material by said electron beam passes through said duct, wherein said source vapor passing through said duct pumps said first chamber;

a second vacuum system coupled to said second chamber for evacuating said second chamber to a second pressure, wherein said second pressure is higher than said first pressure;

a gas source coupled to said second chamber, wherein said nanoparticles are formed within said second chamber upon collision of a gas from said gas source with said portion of said source vapor passing through said duct; and a cooling system coupled to at least a portion of said second chamber and sufficiently cooling said second chamber portion to cause at least a portion of said formed nanoparticles to condense on a surface of said second chamber portion.

2. The nanoparticle production system of claim 1, further comprising a heating system enclosing at least a portion of said first chamber for heating said first chamber sufficiently to promote at least a portion of said source vapor condensed on an inner surface of said first chamber to flow into said crucible.

3. The nanoparticle production system of claim 1, wherein said gas is selected from the group consisting of inert gases and reactive gases.

4. The nanoparticle production system of claim 1, further comprising at least one scraping member within said second chamber, said scraping member dislodging said nanoparticles condensed on said surface of said second chamber portion.

5. The nanoparticle production system of claim 4, further comprising at least one collection bin proximate said duct, said collection bin positioned so as to receive a portion of said nanoparticles dislodged by said scraping member.

6. The nanoparticle production system of claim 1, further comprising a source material feeder.

7. The nanoparticle production system of claim 1, further comprising:

an electron gun housing enclosing a portion of said electron gun;

a vacuum port coupled to said electron gun housing; and a third vacuum system coupled to said vacuum port.

8. The nanoparticle production system of claim 1, wherein said first and second vacuum systems are the same vacuum system.

9. The nanoparticle production system of claim 1, wherein said first pressure is within the range $10^{-4}$ to $10^{-5}$ torr and wherein said second pressure is within the range $10^{-1}$ to $10^{-3}$ torr.

10. The nanoparticle production system of claim 1, wherein said first pressure is less than $10^{-4}$ torr and said second pressure is greater than $10^{-4}$ torr.

11. The nanoparticle production system of claim 1, said cooling system further comprising a liquid nitrogen coolant.

12. The nanoparticle production system of claim 1, further comprising a second cooling system coupled to said crucible.

13. The nanoparticle production system of claim 1, further comprising a vacuum enclosure enclosing said first and second chambers, wherein said first vacuum system evacuates said first chamber through said vacuum enclosure.

14. A nanoparticle production system capable of producing nanoparticles at a rate of kilograms per hour, said system comprising:

a first chamber;

a first crucible within said first chamber for holding a first source material;

a second crucible within said first chamber for holding a second source material;

a first vacuum system coupled to said first chamber for evacuating said first chamber to a first pressure;

an electron beam gun coupled to said first chamber for producing an electron beam, wherein said electron beam gun is maintained at approximately said first pressure;

a second chamber coupled to said first chamber by a duct, wherein a portion of a source vapor produced by irradiating said first and second source materials by said electron beam passed through said duct, wherein said source vapor passing through said duct pumps said first chamber;

a second vacuum system coupled to said second chamber for evacuating said second chamber to a second pressure, wherein said second pressure is higher than said first pressure;

a gas source coupled to said second chamber, wherein said nanoparticles are formed within said second chamber upon collision of a gas from said gas source with said portion of said source vapor passing through said duct; and a cooling system coupled to at least a portion of said second chamber and sufficiently cooling said second chamber portion to cause at least a portion of said formed nanoparticles to condense on a surface of said second chamber portion.

15. The nanoparticle production system of claim 14, further comprising an electron beam steering system for sequentially directing said electron beam at said first and second source materials.

16. A nanoparticle production system capable of producing nanoparticles at a rate of kilograms per hour, said system comprising:

a vacuum enclosure;

a first vacuum system coupled to said vacuum enclosure;

a first chamber within said vacuum enclosure, wherein said first chamber is open to said vacuum enclosure, and wherein said first vacuum system maintains said first chamber at a first pressure of less than $10^{-4}$ torr;

a crucible within said first chamber for holding a source material;

an electron gun for producing an electron beam, wherein said electron gun is maintained at said first pressure;

a second chamber within said vacuum enclosure and coupled to said first chamber by a duct wherein a portion of a source vapor produced by irradiating said source material by said electron beam passes through said duct into said second chamber, wherein at least a portion of a wall of said second chamber is at a reduced temperature;

a vacuum port coupled to said second chamber and passing through said vacuum enclosure;

a second vacuum system coupled to said vacuum port for maintaining a second pressure within said second chamber of more than $10^{-4}$ torr;

a gas inlet coupled to said second chamber and passing through said vacuum enclosure, wherein said nanoparticles are formed within said second chamber upon collision of a gas admitted into said second chamber through said gas inlet with said portion of said source vapor passing through said duct, wherein at least a portion of said formed nanoparticles condense on said portion of said wall of said second chamber;

at least one scraper within said second chamber, said scraper dislodging a portion of said condensed nanoparticles; and a collection bin within said second chamber positioned to collect a portion of said dislodged nanoparticles.

17. A nanoparticle production system capable of producing nanoparticles at a rate of kilograms per hour, said system comprising:

a vacuum enclosure;

a first vacuum system coupled to said vacuum enclosure;

a first chamber within said vacuum enclosure, wherein said first chamber is open to said vacuum enclosure, and wherein said first vacuum system maintains said first chamber at a first pressure of less than $10^{-4}$ torr;

a first crucible within said first chamber for holding a first source material;

a second crucible within said first chamber for holding a second source material;

an electron beam gun for producing an electron beam, wherein said electron beam gun is maintained at said first pressure;

a second chamber within said vacuum enclosure and coupled to said first chamber by a duct wherein a portion of a source vapor produced by irradiating said first source material and said second source material by said electron beam passes through said duct into said second chamber, wherein at least a portion of a wall of said second chamber is at a reduced temperature;

a vacuum port coupled to said second chamber and passing through said vacuum enclosure;

a second vacuum system coupled to said vacuum port for maintaining a second pressure within said second chamber of more than $10^{-4}$ torr;

a gas inlet coupled to said second chamber and passing through said vacuum enclosure, wherein said nanoparticles are formed within said second chamber upon collision of a gas admitted into said second chamber through said gas inlet with said portion of said source vapor passing through said duct, wherein at least a portion of said formed nanoparticles condense on said portion of said wall of said second chamber;

at least one scraper within said second chamber, said scraper dislodging a portion of said condensed nanoparticles; and a collection bin within said second chamber positioned to collect a portion of said dislodged nanoparticles.

18. The nanoparticle production system of claim 17, further comprising an electron beam steering system for sequentially directing said electron beam at said first and second source materials.

* * * * *